No. 855,754. PATENTED JUNE 4, 1907.
W. BUSCHMANN.
SCALE.
APPLICATION FILED OCT. 11, 1906.
FIG. I. 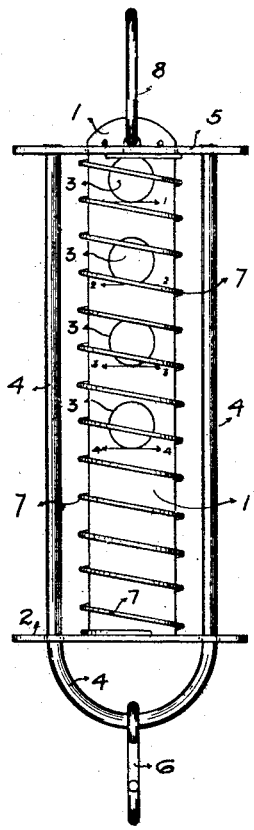
FIG. II. 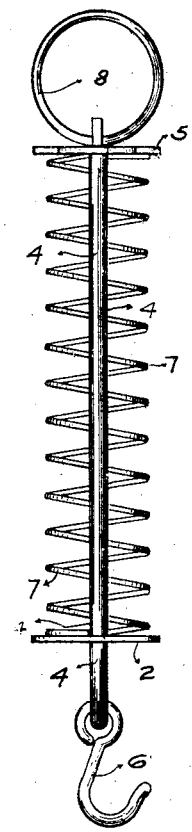
FIG. III. 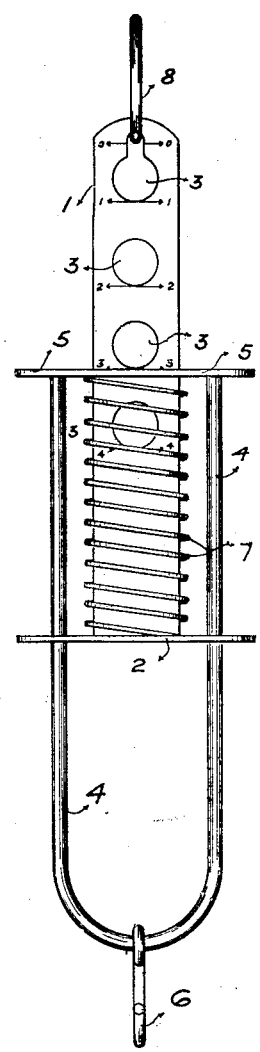
FIG. IV. 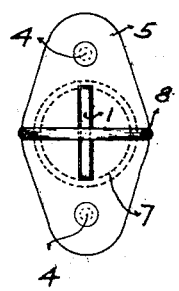
WITNESSES:
Hilda E. Ashworth.
Minnie Lerns.
INVENTOR
William Buschmann
BY
John F. Kerr
ATTORNEY

UNITED STATES PATENT OFFICE.

WILLIAM BUSCHMANN, OF HALEDON, NEW JERSEY.

SCALE.

No. 855,754.          Specification of Letters Patent.          Patented June 4, 1907.

Application filed October 11, 1906. Serial No. 338,357.

*To all whom it may concern:*

Be it known that I, WILLIAM BUSCHMANN, a citizen of the United States, residing at Haledon, in the county of Passaic and State of New Jersey, have invented certain new and useful Improvements in Scales, of which the following is a specification, reference being had therein to the accompanying drawings.

This invention relates to scales for weighing either liquids or solids and is an improvement upon the devices heretofore patented, by United States Letters Patents Nos. 437,899, of October 7, 1890 and 691,110 of January 14, 1902.

The invention is illustrated in the accompanying drawings and consists of the construction, arrangement and combination of parts substantially as set forth.

In the drawings similar numerals refer to like parts, and Figure 1 is a front view of my scale; Fig. 2 a side view thereof; Fig. 3 a front view showing the scale as if in operation, the weight of the matter weighed having drawn the sliding portion of the scale down until either three pounds or quarts are indicated upon the measuring portion of the scale as the case may be; and Fig. 4 is a plan view.

In the drawings the measuring or indicating member of the scale is designated by the numeral —1— which is suspended from the ring or handle —8— and is secured at its lower extremity to a plate —2— having two openings through which the side-bars of the U-shaped sliding frame —4— pass and move in the operation of weighing.

The upper ends of the U-shaped frame are secured to a top-plate —5— which has an elongated opening through which the member —1— is passed. The member —1— is provided with openings —3— or other indices for designating the weight of either liquids, the quantitby weight, or the weight of solids. By moving the finger over the openings —3— a person could ascertain the quantity or weight of the matter weighed or measured in the dark simply by the sense of touch.

A spring is employed for the purpose of holding the parts of the scale in their normal position and in the drawing one way of using a spring is shown by the coiled spring, which, as indicated by —7—, surrounds the member —1— in spirals between the upper face of the lower plate —2— and the lower face of the upper plate —5—. These springs may be so constructed that they may be used for a considerable time without impairing the accuracy for measuring weight or quantity. Means —6— which may be a hook or other appropriate device may be employed to hold the matter or the object in which it is held while being weighed or measured.

With this description of my invention, what I claim and desire to secure by Letters-Patent, is:—

1. In a scale, the combination of an index-member, a plate secured to the lower end thereof and provided with two openings therethrough, a U-shaped frame the arms of which pass through said openings and a plate secured to the top of said U-shaped frame having an opening through which the index member is adapted to pass, with a spring adapted to press the index-plate and the frame-plate apart, substantially as and for the purposes set forth and described.

2. An index-member, a plate secured thereto having openings and a U-shaped frame the arms of which pass through said openings, in combination with a plate secured to the ends of the U-shaped frame and provided with an opening through which the index-member may pass and yielding means adapted to press said plates apart, substantially as set forth.

In testimony whereof I affix my signature in presence of two witnesses.

WILLIAM BUSCHMANN.

Witnesses:
JOHN F. KERR,
HILDA E. ASHWORTH.